(12) United States Patent
Katsumata et al.

(10) Patent No.: US 6,322,710 B1
(45) Date of Patent: Nov. 27, 2001

(54) SLURRY MANAGING SYSTEM AND SLURRY MANAGING METHOD

(75) Inventors: Noboru Katsumata, Yokosuka; Takaharu Nishida, Osaka; Kazuki Omori, Kawasaki, all of (JP)

(73) Assignees: Mitsubishi Kakoki Kaisha Ltd.; Nippei Toyama Corporation; Toyobo Co., Ltd., all of (JP)

(*) Notice: Subject to any disclaimer, the term of this patent is extended or adjusted under 35 U.S.C. 154(b) by 0 days.

(21) Appl. No.: 09/218,839

(22) Filed: Dec. 22, 1998

(30) Foreign Application Priority Data

Dec. 26, 1997 (JP) .................................................... 9-360724
Dec. 16, 1998 (JP) ................................................... 10-357544

(51) Int. Cl.$^7$ ............................... B04B 9/10; B04B 13/00
(52) U.S. Cl. ..................... 210/740; 210/739; 210/787; 210/97; 210/103; 210/322; 210/380.1; 494/1; 494/7; 494/84
(58) Field of Search ........................ 210/787, 97, 103, 210/322, 739, 380.1, 740; 494/1, 7, 84

(56) References Cited

U.S. PATENT DOCUMENTS

| | | | |
|---|---|---|---|
| 4,952,127 | * | 8/1990 | Schmeisser et al. ............... 494/1 |
| 5,799,643 | * | 9/1998 | Miyata et al. ...................... 494/8 |
| 5,857,955 | * | 1/1999 | Phillips et al. .................... 494/8 |

FOREIGN PATENT DOCUMENTS

| | | |
|---|---|---|
| 1316170 | 12/1989 | (JP) . |
| 7251373 | 10/1995 | (JP) . |
| 8039430 | 2/1996 | (JP) . |
| 9168971 | 6/1997 | (JP) . |
| 9201819 | 8/1997 | (JP) . |
| 9225937 | 9/1997 | (JP) . |

* cited by examiner

Primary Examiner—David A. Reifsnyder
(74) Attorney, Agent, or Firm—Stetina Brunda Garred & Brucker

(57) ABSTRACT

A managing system for managing slurry, which is used to machine workpieces. The slurry contains dispersion liquid and abrasive grains. Slurry that has been used in machining further includes impurities that are smaller than the abrasive grains. A first decanter centrifugally separates a mixture of impurities and dispersion liquid from the used slurry to recover recyclable abrasive grains from the slurry. A second decanter centrifugally separates impurities from the mixture to recover recyclable dispersion liquid from the slurry. A specific gravity gage and a viscosity gage detect properties of the used slurry. The rotating speeds of the first and second decanters are controlled in accordance with the detected properties of the slurry. This always maintains the separating efficiency of both decanters at an optimal value thus effectively recovering and recycling the abrasive grains and dispersion liquid.

15 Claims, 13 Drawing Sheets

SLURRY MANAGING SYSTEM AND SLURRY MANAGING METHOD

BACKGROUND OF THE INVENTION

The present invention relates to a system and method for managing slurry that is, for example, used when cutting workpieces with wire saws. More particularly, the present invention relates to slurry managing systems and slurry managing methods that enable optimal separation of impurities from used slurry.

A wire saw is typically employed to cut workpieces, such as silicon ingots, into wafers. The wire saw includes a plurality of rollers and a single strand of wire, which is spirally wound about the rollers with a predetermined pitch between each winding. The wire is guided by the rotation of the rollers. During rotation of the rollers, slurry containing abrasive grains is fed to the wire. In this state, a workpiece is pressed against the wire to cut the workpiece into a plurality of wafers simultaneously.

The slurry is an aqueous or oleaginous liquid (dispersion liquid) that contains abrasive grains. The wire saw is provided with a managing system to prepare and manage the slurry. The managing system includes a preparation tank, in which the abrasive grains and dispersion liquid are mixed to prepare the slurry. The slurry prepared in the preparation tank is fed to the wire saw.

It is preferred that the used slurry be recycled to reduce the costs of cutting the workpieces. However, used slurry includes impurities, which are fine grain components that are smaller than the abrasive grains. More specifically, the used slurry includes impurities such as cutting chips, produced during cutting of workpieces, and fragmented abrasive grains. The impurities decrease the cutting capability of the wire saw.

The managing system includes a separating apparatus that separates the impurities from the used slurry and recovers the recyclable abrasive grains and dispersion liquid. The separating apparatus has a first centrifugal separator for centrifugally separating turbid dispersion liquid, which includes impurities, from the used slurry to recover recyclable abrasive grains, and a second centrifugal separator for centrifugally separating impurities from the turbid dispersion liquid to recover recyclable dispersion liquid. The recovered abrasive grains and dispersion liquid are returned to the preparation tank to be prepared as slurry again. The slurry is then fed to the wire saw from the preparation tank and thus recycled.

Fluctuations in the temperature of the used slurry or in the amount of impurities included in the used slurry change the properties of the used slurry (e.g., specific gravity or viscosity). The changes in the properties of the used slurry alter the separating efficiency of the first and second centrifugal separators. This may hinder sufficient recovery of the abrasive grains and dispersion liquid from the used slurry or result in residual impurities left in the recovered abrasive grains and dispersion liquid.

SUMMARY OF THE INVENTION

Accordingly, the present invention has been made to provide a solution to the above problems. It is an objective of the present invention to provide a slurry managing system and managing method that separates impurities from used slurry and guarantees the recovery of recyclable abrasion grains and dispersion liquid regardless of changes in the slurry properties.

To achieve the above objectives, the present invention provides a system for managing slurry that is used for the machining of workpieces. The slurry includes dispersion liquid and abrasive grains. The managing system includes a separating means, a detecting means, and a control means. The separating means performs a separation process on slurry that has been used during machining to recover at least recyclable abrasive grains from the slurry. The separating means rotates and applies centrifugal force to the slurry to separate components from the slurry. The detecting means detects a property of the used slurry. The control means controls the rotating speed of the separating means in accordance with the detected property of the slurry.

The present invention further provides a method for managing slurry that is used for the machining of workpieces. The slurry includes dispersion liquid and abrasive grains. The managing method includes the steps of separating components from used slurry that was employed during machining to recover at least recyclable abrasive grains from the used slurry by applying centrifugal force to the used slurry, detecting a property of the used slurry, and controlling the centrifugal acceleration applied to the slurry in accordance with the detected property of the slurry.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings.

DETAILED DESCRIPTION OF THE PREFERRED EMBODIMENTS

Figure 1:
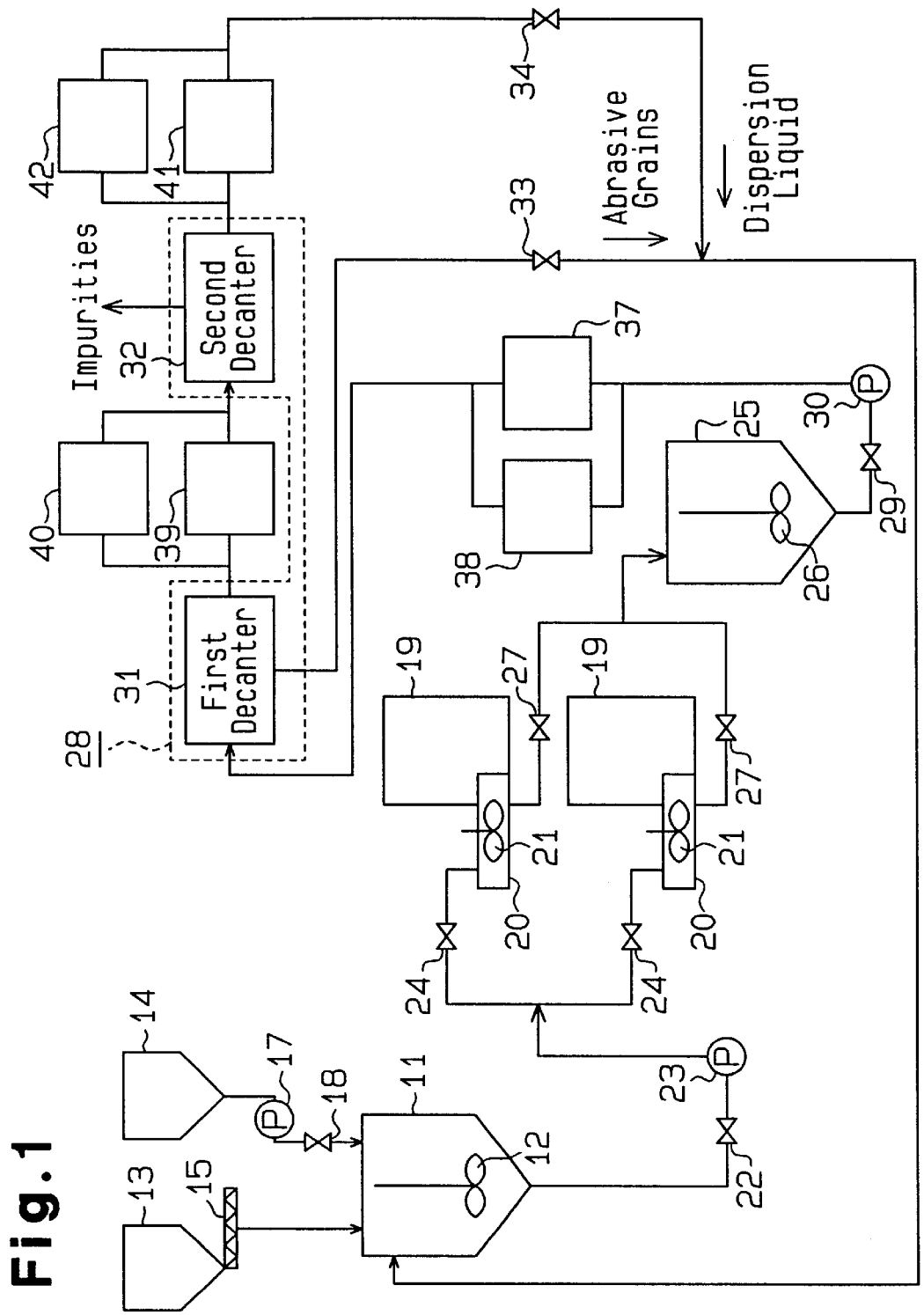
FIG. 1 is a diagrammatic view showing a slurry managing system according to a first embodiment of the present invention.

A first embodiment of a slurry managing system according to the present invention will now be described with reference to FIGS. 1 to 5. As shown in FIG. 1, a preparation tank 11 houses an agitator 12. A hopper 13, which contains abrasive grains, and a dispersion liquid tank 14, which contains oleaginous dispersion liquid, are arranged above the preparation tank 11. The abrasive grains in the hopper 13 are fed to the preparation tank 11 by a vibrating feeder 15. The dispersion liquid in the dispersion tank 14 is sent to the preparation tank 11 through a pump 17 and a valve 18. The abrasive grains and dispersion liquid are agitated and mixed in the preparation tank 11 to prepare a slurry having a predetermined mixture ratio of the abrasive grains and dispersion liquid.

The mixture ratio between the abrasive grains and the dispersion liquid is approximately 1:0.70 to 1:0.98 by weight. Grains made of a material such as silicon nitride or silicon carbide and having a size of, for example, #600, #800, or #1000, are employed as the abrasive grains. Silicon oil (e.g., manufactured by Paresu Kagaku Kabushiki Kaisha, product number PS-LW-1) is employed as the dispersion liquid.

A plurality of wire saws 19 are arranged downstream of the preparation tank 11. A slurry tank 20, which houses an agitator 21, is provided for each wire saw 19. Fresh slurry is sent into each slurry tank 20 from the preparation tank 11 through a valve 22, a pump 23, and a valve 24. A predetermined amount of slurry is constantly reserved in each slurry tank 20.

Although not shown in the drawings, each wire saw 19 has a plurality of rollers and a single strand of wire, which is spirally wound about the rollers with a predetermined pitch between each winding. The wire is guided by the rotation of the rollers. During rotation of the rollers, slurry, which contains abrasive grains, is fed to the wire from the slurry tank 20. In this state, a workpiece is pressed against the wire to cut the workpiece into a plurality of wafers, simultaneously. During the cutting, used slurry is recovered in the slurry tank 20 and then fed again to the moving wire. Thus, the slurry is repeatedly used.

A slurry waste tank 25, which houses an agitator 26, is arranged downstream of the slurry tanks 20. The slurry in each slurry tank 20 is either entirely or partially discharged into the slurry waste tank 25 periodically. The preparation tank 11 replenishes each slurry tank 20 with fresh slurry in accordance with the amount of discharged slurry.

A separating/recovering mechanism 28 is arranged downstream of the slurry waste tank 25. The used slurry in the slurry waste tank 25 is transferred to the separating/recovering mechanism 28 through a valve 29 and a pump 30. The separating/recovering mechanism 28 separates impurities from the used slurry to recover recyclable abrasion grains and dispersion liquid. Impurities, which are fine grain components smaller than the abrasive grains, include cutting chips, produced during cutting of workpieces, and fragmented abrasive grains. The separating/recovering mechanism 28 has a first decanter 31, which serves as a first separating means, and a second decanter 32, which serves as a second separating means.

Figure 2:
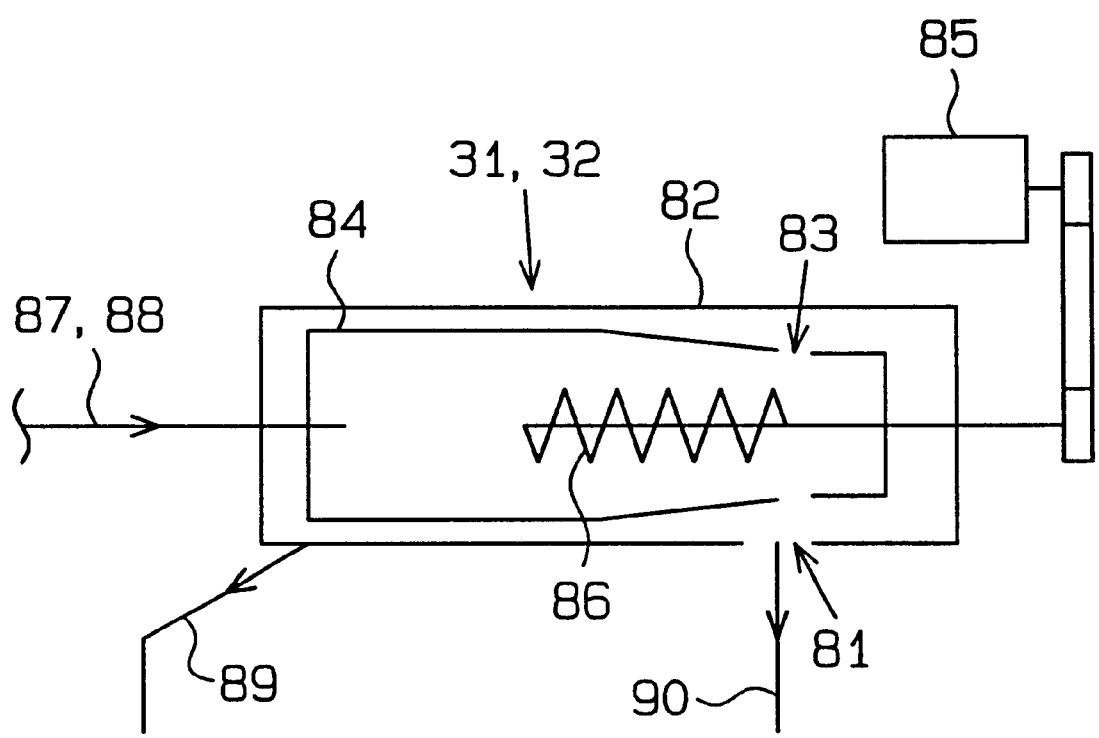
FIG. 2 is a diagrammatic view showing the first and second decanters employed in the managing system of FIG. 1.

A screw conveyor type centrifugal separator, such as that shown in FIG. 2, is employed as the first decanter 31 and the second decanter 32. The rotating speed of the second decanter 32 is higher than that of the first decanter 31.

The first decanter 31 centrifugally separates the used slurry into recyclable abrasive grains, for example, grains having a grain diameter of five micrometers or larger, and turbid dispersion liquid (hereafter referred to as primary separation liquid), which includes fine grain components that are smaller than the recyclable abrasive grains and impurities. The first decanter 31 then recovers the recyclable abrasive grains. The second decanter 32 centrifugally separates the primary separation liquid into impurities and purified recyclable dispersion liquid to recover recyclable dispersion liquid (hereafter referred to as secondary separation liquid).

The abrasive grains recovered by the first decanter 31 and the secondary separation liquid are returned to the preparation tank 11 and mixed by way of valves 33, 34. A weight gage (not shown) is arranged in the preparation tank 11. The measurements taken by the gage are used to calculate the recovered amount of the liquid mixture of the abrasive grains and secondary separation liquid returned to the preparation tank 11. The preparation tank 11 is replenished with fresh abrasive grains and dispersion liquid from the hopper 13 and the dispersion liquid tank 14, respectively, in accordance with the recovered amount of the liquid mixture. The fresh abrasive grains and dispersion liquid are mixed with the returned abrasive grains and the secondary separation liquid to prepare the slurry.

A first specific gravity gage 37 and a first viscosity gage 38 are arranged between the slurry waste tank 25 and the separating/recovering mechanism 28 to detect the properties of the used slurry. When used slurry is transferred from the slurry waste tank 25 to the separating/recovering mechanism 28, the specific gravity and flow rate of the used slurry are detected by the first specific gravity gage 37, and the viscosity of the used slurry is detected by the first viscosity gage 38.

A second specific gravity gage 39 and a second viscosity gage 40 are arranged between the first decanter 31 and the second decanter 32 to detect the properties of the primary separation liquid. When the primary separation liquid is transferred from the first decanter 31 to the second decanter 32, the specific gravity and flow rate of the primary separation liquid are detected by the second specific gravity gage 39, and the viscosity of the primary separation liquid is detected by the second viscosity gage 40.

A third specific gravity gage 41 and a third viscosity gage 42 are arranged at the outlet of the second decanter 32 to detect the properties of the secondary separation liquid. When the secondary separation liquid (i.e., recyclable dispersion liquid) recovered by the second decanter 32 is returned to the preparation tank 11, the specific gravity and flow rate of the secondary separation liquid are detected by the third specific gravity gage 41, and the viscosity of the secondary separation liquid is detected by the third viscosity gage 42.

As shown in FIG. 2, the decanters 31, 32 each include a case 82 having an external discharge hole 81, a rotatable separating tube 84 accommodated in the case 82, and a rotatable screw conveyor 86 housed in the separating tube 84. The separating tube 84 has a plurality of liquid waste holes (not shown) and an internal discharge hole 83. The separating tube 84 of the first decanter 31 is rotated by a first motor 51, shown in FIG. 3, and the separating tube 84 of the second decanter 32 is rotated by a second motor 52, shown in FIG. 3. The screw conveyor 86 is rotated by a motor 85.

After passing through the first viscosity gage 38 and the first specific gravity gage 37, the used slurry is sent into the separating tube 84 of the first decanter 31 through a pipe 87. After passing through the second viscosity gage 40 and the second specific gravity gage 39, the primary separation liquid is sent into the separating tube 84 of the second decanter 32 through a pipe 88.

High speed rotation of the separating tube 84 centrifugally separates the used slurry or the primary separation liquid. In the first decanter 31, the primary separation liquid, separated from the used slurry by centrifugal force, is sent into the case 82 through the liquid waste holes. Afterward, the primary separation liquid is sent toward the second viscosity gage 40 and the second specific gage 39 through a pipe 89. The recyclable abrasive grains, recovered from the used slurry, is sent toward one end of the separating tube 84 by the screw conveyor 86. Afterward, the recyclable abrasive grains are discharged through the internal discharge hole 83 and the external discharge hole 81 and sent toward the preparation tank 11 through a pipe 90.

In the second decanter 32, the secondary separation liquid, separated from the primary separation liquid, is sent into the case 82 through the liquid waste holes. Afterward, the secondary separation liquid is sent toward the third viscosity gage 42 and the third specific gage 41 through a pipe 89 and consequently delivered to the preparation tank 11. The impurities, recovered from the primary separation liquid, are sent toward one end of the separating tube 84 by the screw conveyor 86. The impurities are then discharged through the internal discharge hole 83 and the external discharge hole 81 and sent out of the managing system through a pipe 90 as waste.

During centrifugal separation of the used slurry, the rotating speed of the separating tube 84 in the first decanter 31 is set such that the centrifugal acceleration acting on the used slurry is within a range of 150 to 700G, and is optimally within a range of 300 to 500G. During centrifugal separation of the primary separation liquid, the rotating speed of the separating tube 84 in the second decanter 32 is set such that the centrifugal acceleration acting on the used slurry is within a range of 2000 to 5000G, and is optimally within a range of 3000 to 4000G.

Known gages are employed as the specific gravity gages 37, 39, 41 and the viscosity gages 38, 40, 42. A micromotion flow meter (manufactured by Ohbaru Kabushiki Kaisha), which simultaneously detects the specific gravity and flow rate of a liquid, may be employed as the specific gravity gages 37, 39, 41. A pressure/differential-pressure transmitter 3051C (manufactured by Fisher-Rosemount Japan Kabushiki Kaisha) may be employed as the viscosity gages 38, 40, 42. The viscosity gages 38, 40, 42 accurately measure the viscosity of the used slurry, the primary separation liquid and the secondary separation liquid.

Figure 3:
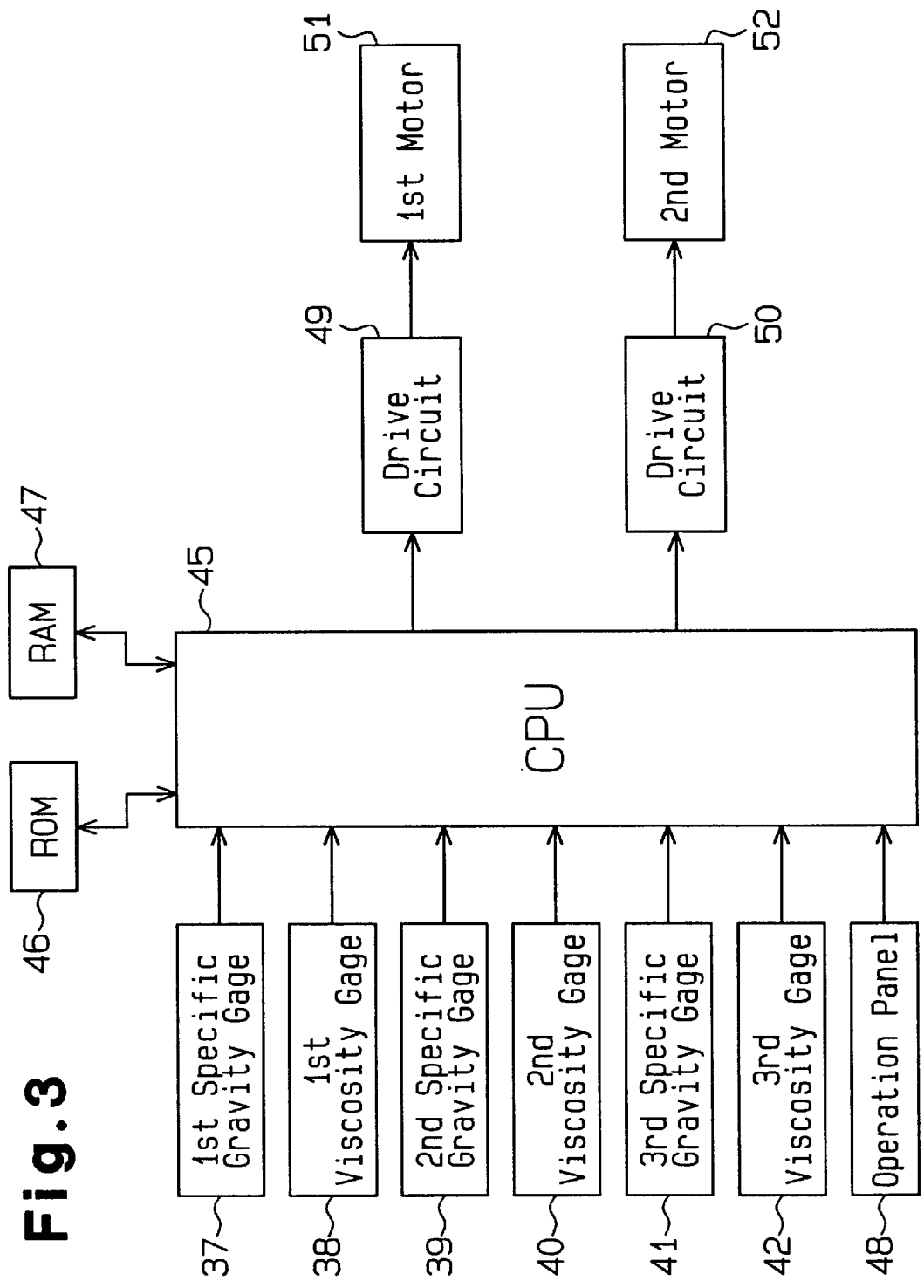
FIG. 3 is a block diagram showing the electric structure of the managing system in FIG. 1.

The electric structure of the above slurry managing system will now be described. As shown in FIG. 3, a central processing unit (CPU) 45 controls operation of the entire slurry managing system. Various types of control programs that are necessary for the operation of the slurry control system are stored in a read only memory (ROM) 46. Data obtained during execution of the control programs is temporarily stored in a random access memory (RAM) 47. The CPU 45, the ROM 46, and the RAM 47 form a control means.

The CPU 45 receives detection signals from the first to third specific gravity gages 37, 39, 41, detection signals from the first to third viscosity gages 38, 40, 42, and operation signals from an operation panel 48. The CPU 45 also sends actuation signals to the first motor 51 of the first decanter 31 and the second motor 52 of the second decanter 32 by way of drive circuits 49, 50, respectively.

Figure 4:
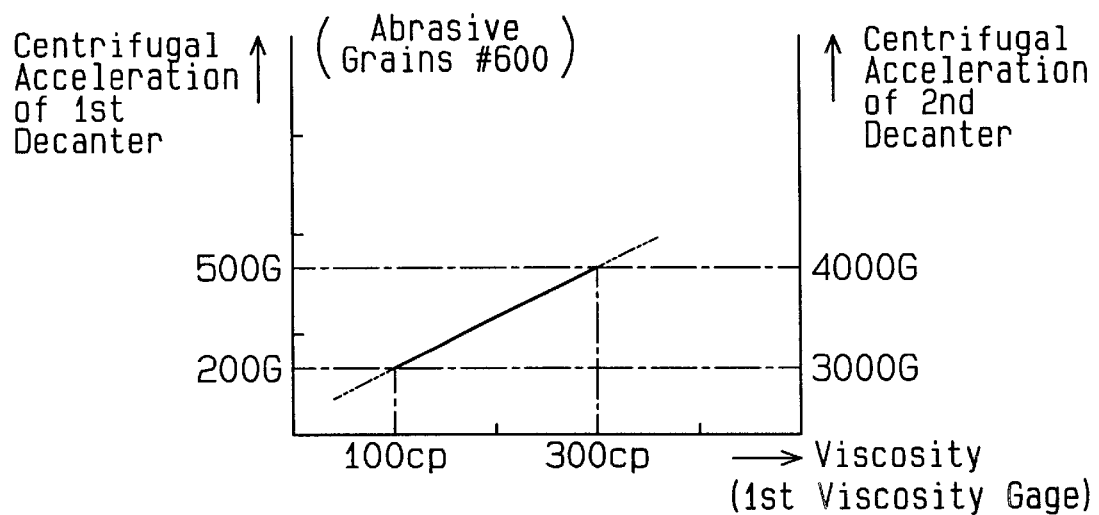
FIG. 4 is a graph exemplarily showing the relationship between the viscosity of the used slurry and the appropriate centrifugal acceleration of the first and second decanters.

Data used to obtain a high separating efficiency is prestored in the ROM 46. For example, data that sets the relationship between the specific gravity of the used slurry and the appropriate rotating speed of each decanter 31, 32, and data that sets the relationship between the viscosity of the used slurry and the appropriate rotating speed of each decanter 31, 32 are prestored in the ROM 46. FIG. 4 is a graph showing an exemplary relationship between the viscosity of the used slurry and the appropriate centrifugal acceleration (which is related to the rotating speed) of each decanter 31, 32. The CPU 45 refers to the data in the ROM 46 based on the specific gravity and viscosity measured by the first specific gravity gage 37 and the first viscosity gage 38 to control the motors 51, 52 of the associated decanters 31, 32.

For example, as shown in FIG. 4, if the viscosity of the used slurry is 100 cp (centipoise), the rotating speeds of the motors 51, 52 are controlled such that the centrifugal acceleration of the first decanter 31 is 200G and the centrifugal acceleration of the second decanter 32 is 3000G. The rotating speed of the motors 51, 52 is increased to increase the centrifugal acceleration as the viscosity of the used slurry becomes higher. If the viscosity of the used slurry is 300 cp, the rotating speeds of the motors 51, 52 are controlled such that the centrifugal acceleration of the first decanter 31 is 500G and the centrifugal acceleration of the second decanter 32 is 4000G.

The operation of the slurry managing system will now be described. When the wire saws 19 start to cut workpieces, the slurry prepared in the preparation tank 11 is fed to the wire of each wire saw 19 by the associated slurry tank 20. The slurry used by each wire saw 19, or the used slurry, is sent to the separating/recovering mechanism 28 by way of the slurry waste tank 25 to undergo a separating process. The first decanter 31 and the second decanter 32 separate the impurities from the used slurry to recover the recyclable abrasive grains and the recyclable dispersion liquid (secondary separation liquid). The recovered abrasion grains and dispersion liquid are then returned to the preparation tank 11.

Figure 5:
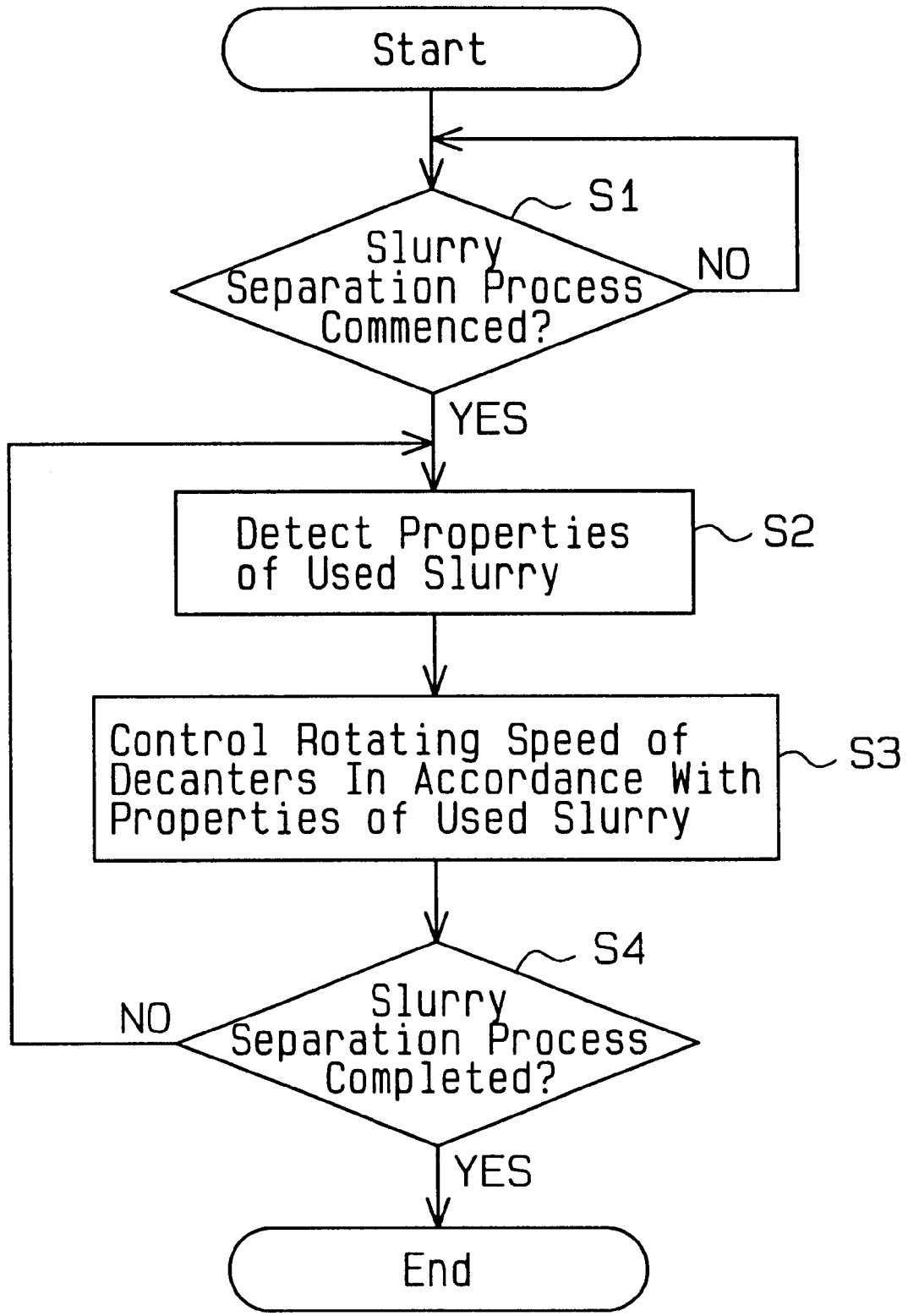
FIG. 5 is a flowchart describing the slurry separation process carried out by the managing system of FIG. 1.

FIG. 5 is a flowchart illustrating the slurry separation process. As shown in the flowchart, at step S1, the CPU 45 confirms the commencement of the slurry separation process. At step S2, the CPU 45 detects the properties of the used slurry (specific gravity, flow rate, and viscosity), which is transferred from the slurry waste tank 25 to the separating/recovering mechanism 28, based on the detection signals sent from the first specific gravity gage 37 and the first viscosity gage 38.

At step S3, the CPU 45 refers to data, such as that illustrated in FIG. 4, and controls the rotating speed of the motors 51, 52 of the associated decanters 31, 32 in accordance with the detected properties of the used slurry. Accordingly, the decanters 31, 32 maintain a high separation efficiency regardless of changes in the specific gravity or viscosity of the used slurry. In other words, in the first decanter 31, the primary separation liquid is separated from the used slurry in a preferred manner to guarantee recovery of the recyclable abrasive grains. In the second decanter 32, impurities are separated from the primary separation liquid in a preferred manner to guarantee recovery of a recyclable secondary separation liquid, or a highly purified dispersion liquid.

At step S4, the CPU 45 determines whether or not the slurry separation process has been completed. The CPU 45 continues to perform steps S2 and S3 until completion of the slurry separation process.

As described above, in the present embodiment, the actual separating efficiency of each decanter 31, 32 is judged in accordance with the properties of the used slurry. The rotating speeds of the decanters 31, 32 are feedback controlled to maintain the actual separating efficiency at an optimal value. Therefore, the separating efficiency of the decanters 31, 32 are constantly maintained at an optimal value to effectively recycle the abrasion grains and dispersion liquid.

Data related with specific gravity and viscosity, and accurately representing the properties of the used slurry, is used to control the rotating speed of the decanters 31, 32. Accordingly, the rotating speeds of the decanters 31, 32 are controlled in an optimal manner.

A second embodiment according to the present invention will now be described with reference to FIGS. 6 to 8. In this embodiment, the properties of the primary separation liquid, which is separated in the first decanter 31, and the properties of the secondary separation liquid, which is separated in the second decanter 32, are detected. The rotating speed of the decanters 31, 32 are corrected and changed such that the detection results are within an appropriate range.

Figure 8:
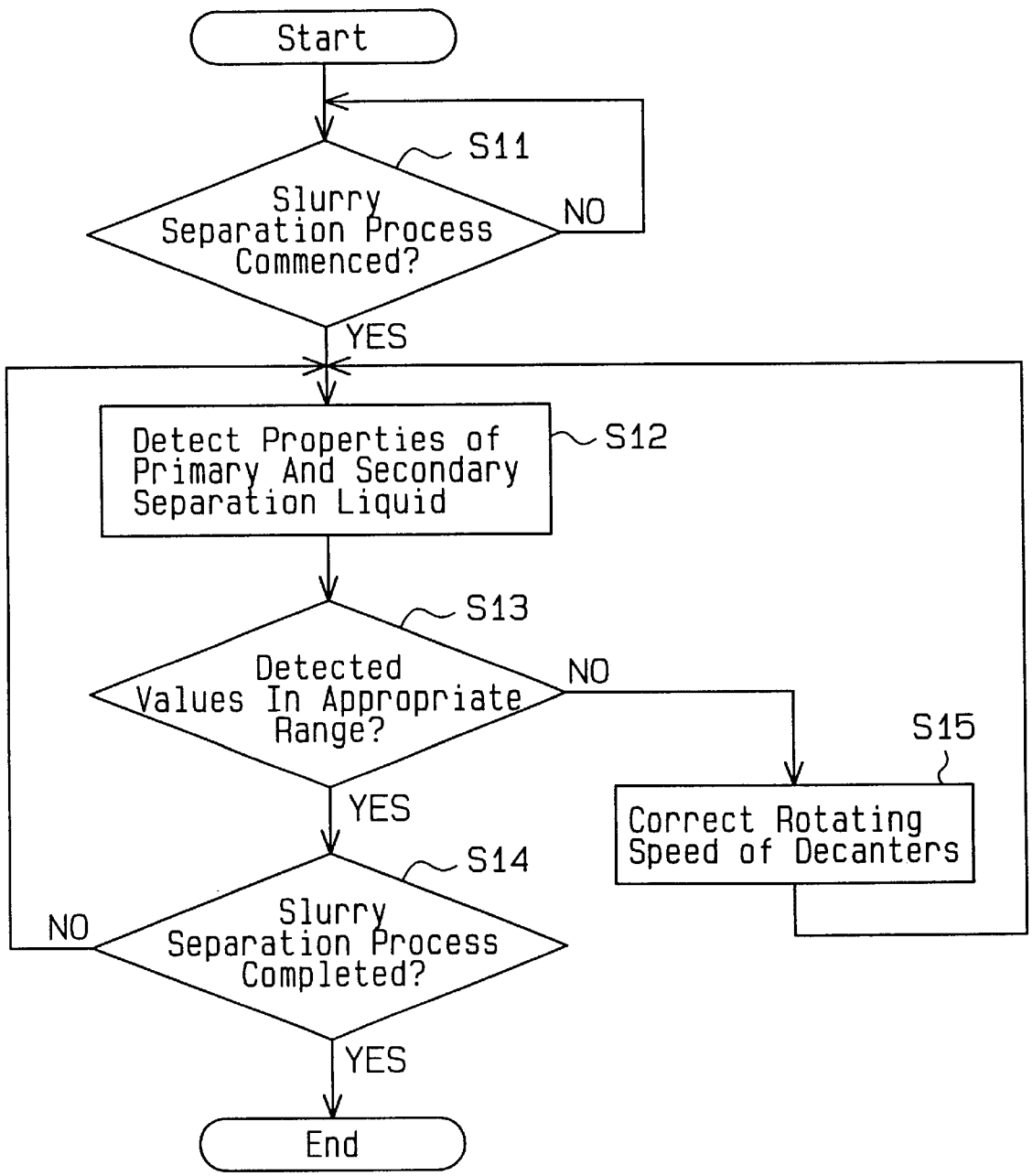
FIG. 8 is a flowchart describing the slurry separation process carried out in the second embodiment.

As shown in FIG. 8, at step S11, if it is confirmed that the slurry separation process has been commenced, the CPU 45 proceeds to step S12. In this embodiment, the basic rotating speed of the first decanter 31 during commencement of the slurry separation process is set, for example, such that the centrifugal acceleration reaches 200G, and the basic rotating speed of the second decanter 32 during commencement of the slurry separation process is set, for example, such that the centrifugal acceleration reaches 3000G.

At step S12, the CPU 45 detects the properties of the primary separation liquid based on the detection signals sent from the second specific gravity gage 39 and the second viscosity gage 40. The CPU 45 also detects the properties of the secondary separation liquid based on the detection signals sent from the third specific gravity gage 41 and the third viscosity gage 42.

At step S13, the CPU 45 judges whether or not the detection values related to the properties of the primary and secondary separation liquids are each included within a predetermined, appropriate range. If the detection values are included within the appropriate range, the CPU 45 proceeds to step S14 and judges whether or not the slurry separation process has been completed. If the slurry separation process has not been completed, the CPU 45 returns to step S12.

If it is determined that the detected values are not included in the appropriate range in step S13, the CPU 45 proceeds to step S15. At step S15, the CPU 45 corrects and changes the rotating speed of the motors 51, 52 of the associated decanters 31, 32 such that the detected values enter the appropriate range. Afterward, the CPU 45 returns to step S12.

Figure 6:
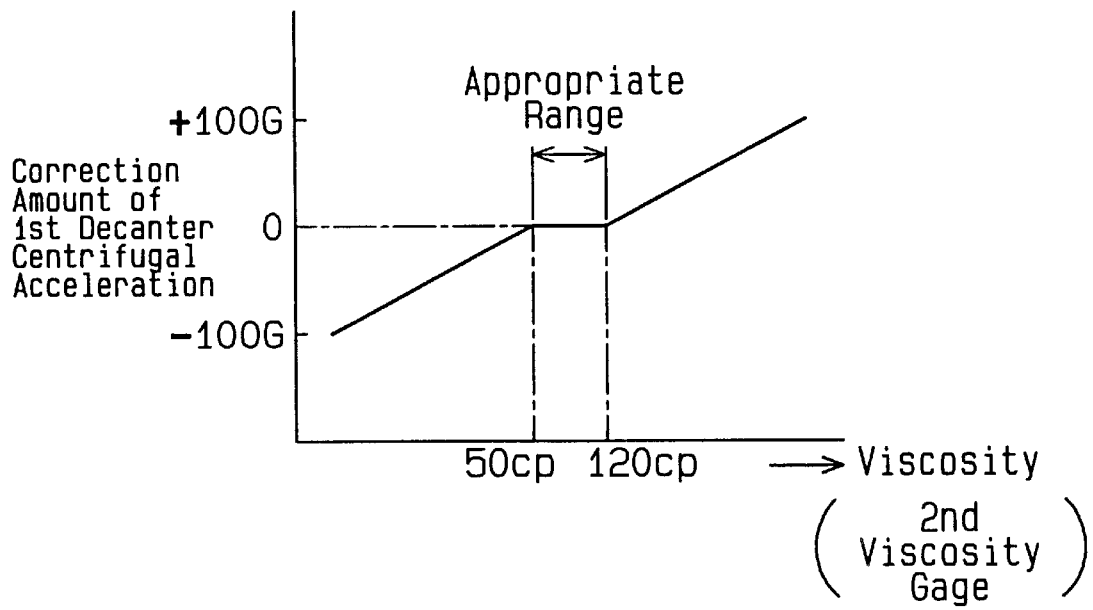
FIG. 6 is a graph showing an example of the correction control executed by the first decanter employed in a second embodiment.

FIG. 6 is a graph showing an exemplary relationship between the viscosity of the primary separation liquid and the correction amount of the centrifugal acceleration (which is related to the rotating speed) of the first decanter 31. FIG. 7 is a graph showing an example of data that sets the relationship between the viscosity of the secondary separation liquid and the correction amount of the centrifugal acceleration (interrelated with the rotating speed) of the first and second decanters 31, 32.

Figure 7:
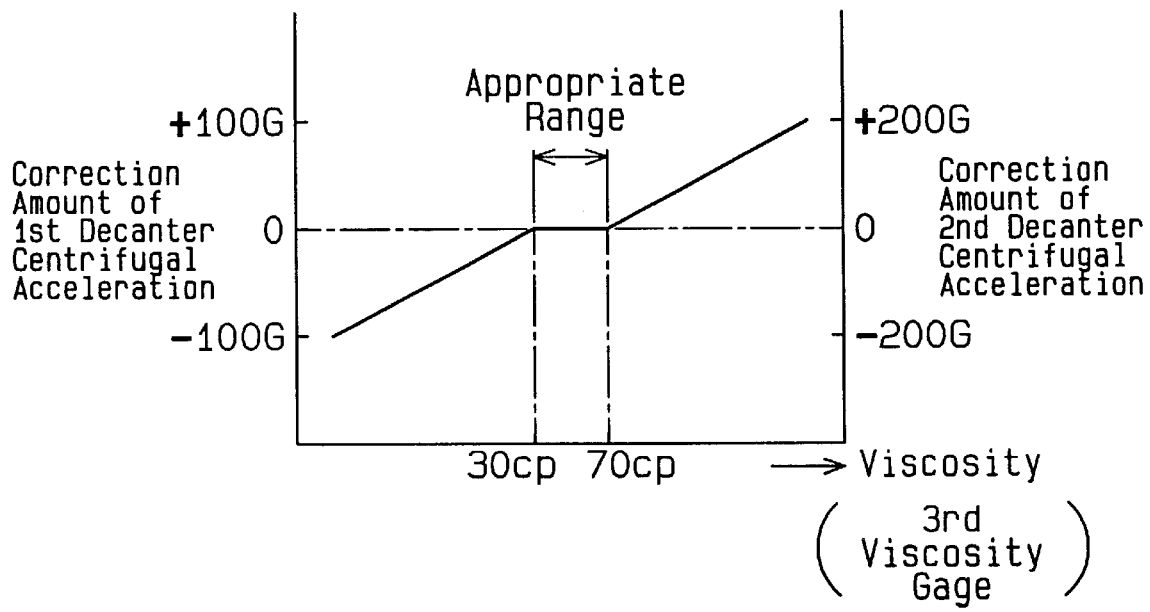
FIG. 7 is a graph showing an example of the correction control executed by the first and second decanters employed in the second embodiment.

When performing steps S13 and S15, which are illustrated in FIG. 8, the CPU 45 refers to the data shown in FIGS. 6 and 7 to correct the rotating speed of the motors 51, 52 of the associated decanters 31, 32 in accordance with the detected viscosity of the primary and secondary separation liquids. If the specific gravity of the primary and secondary separation liquids are varied, the motors 51, 52 are further controlled by different correction values.

As described above, the rotating speeds of the decanters 31, 32 are corrected in accordance with the properties of the primary and secondary separation liquids discharged from the decanters 31, 32. Thus, the properties of the primary and secondary separation liquids such as viscosity and specific gravity are accurately and easily adjusted to appropriate values. In other words, the abrasive grains and dispersion liquid are recovered accurately.

Data showing the relationship between the properties of the primary and secondary separation liquids and the appropriate centrifugal acceleration of the decanters 31, 32 may also be used. Such data may be used to control rotation in the decanters 31, 32.

A third embodiment according to the present invention will now be described with reference to FIGS. 9 and 10. In this embodiment, the specific gravity and flow rate of the used slurry detected by the first specific gravity gage 37, the specific gravity and flow rate of the primary separation liquid detected by the second specific gravity gage 39, and the specific gravity and flow rate of the secondary separation liquid detected by the third specific gravity gage 41 are used to calculate a solids recovery rate of the decanters 31, 32. The rotating speeds of the first and second decanters 31, 32 are corrected such that the solids recovery rate is within a predetermined, appropriate range. The solids recovery rate refers to the percentage of the total weight of the abrasive grains and impurities collected by the decanters 31, 32 relative to the weight of the solids included in the used slurry.

Figure 10:
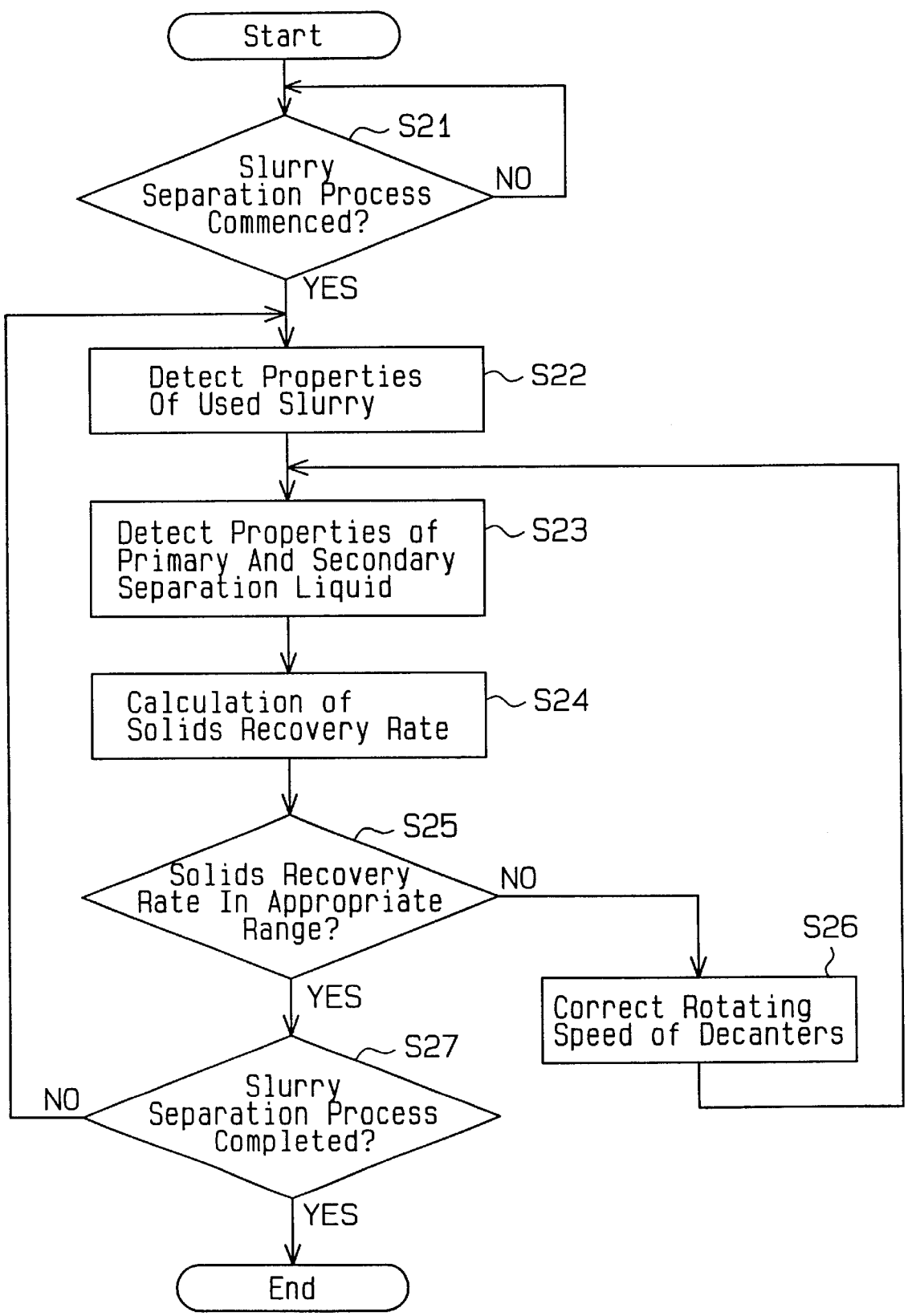
FIG. 10 is a flowchart describing the slurry separation process carried out in the third embodiment.

As shown in FIG. 10, at step S21, if it is confirmed that the slurry separation process has been commenced, the CPU 45 proceeds to step S22. In this embodiment, the basic rotating speed of the first decanter 31 during commencement of the slurry separation process is set, for example, such that the centrifugal acceleration reaches 200G, and the basic rotating speed of the second decanter 32 during commencement of the slurry separation process is set, for example, such that the centrifugal acceleration reaches 3000G.

At step S22, the CPU 45 detects the properties of the used slurry (specific gravity and flow rate), which is transferred from the slurry waste tank 25 to the separating/recovering mechanism 28, based on the detection signals sent from the first specific gravity gage 37. At step S23, the CPU 45 detects the properties of the primary separation liquid (specific gravity and flow rate) based on the detection signals sent from the second specific gravity gage 39. The CPU 45 also detects the properties of the secondary separation liquid (specific gravity and flow rate) based on the detection signals sent from the third specific gravity gage 41.

At step S24, the CPU 45 calculates the solids recovery rate of the decanters 31, 32 based on the detected specific gravity and flow rate of the used slurry, the detected specific gravity and flow rate of the primary separation liquid, and the specific gravity and flow rate of the secondary separation liquid.

At step S25, the CPU 45 judges whether the calculated solids recovery rate is within a predetermined, appropriate range. If the solids recovery rate is within the appropriate range, the CPU 45 proceeds to step S27 and judges whether or not the slurry separation process has been completed. If it is determined that the slurry separation process has not been completed, the CPU 45 returns to step S22.

If it is determined in step S25 that the solids recovery rate is not within the appropriate range, the CPU 45 proceeds to step S26. At step S26, the CPU 45 corrects the rotating speed of the motors 51, 52 of the decanters 31, 32 so that the solids recovery rate enters the appropriate range. The CPU 45 then returns to step S23.

As a result of the above processing, the solids recovery rate of the first decanter 31 and the second decanter 32, or the separating efficiency, remains substantially constant regardless of fluctuations in the mixing ratio of the abrasive grains and cutting chips during operation of the wire saws 19.

The solids recovery rate is obtained based on the detection values of the first to third specific gravity gages 37, 39, 41 by following procedures (A) to (E), which are described below. The specific gravities of the abrasive grains in the used slurry, the dispersion liquid, and the cutting chips, and the detection values of the first to third specific gravity gages 37, 39, 41 are defined as described below.

specific gravity of the abrasive grains: da
  specific gravity of the dispersion liquid: do
  specific gravity of the cutting chips: ds
  flow rate of the used slurry: F0 (L/hr)
  specific gravity of the used slurry: D0
  flow rate of the primary separation liquid: F1 (L/hr)
  specific gravity of the primary separation liquid: D1
  flow rate of the secondary separation liquid: F2 (L/hr)
  specific gravity of the secondary separation liquid: D2

(A) The weight of the solids S0 (kg) (i.e., abrasive grains and cutting chips) and of the dispersion liquid O0 (kg) in the used slurry, are obtained from relational expressions (1), (2), which are described below.

$$O0+S0=F0 \times D0 \quad (1)$$

$$O0/do+S0/da=F0 \quad (2)$$

The solids weight S0 and the dispersion liquid weight O0 are calculated from expressions (1) and (2).

$$S0=\{daF0 \cdot (D0-do)\}/\{da-do\}$$

$$O0=F0 \cdot D0-S0$$

(B) The weight of the solids S1 (kg) and of the dispersion liquid O1 (kg) in the primary separation liquid are obtained by using the relational expressions (1), (2) in the same manner as in procedure (A).

$$S1=\{daF1 \cdot (D1-do)\}/\{da-do\}$$

$$O1=F1 \cdot D1-S1$$

(C) The weight of the solids S2 (kg) and of the dispersion liquid O2 (kg) in the secondary separation liquid are obtained by using the relational expressions (1), (2) in the same manner as in procedure (A).

$$S2=\{dsF2 \cdot (D2-do)\}/\{ds-do\}$$

$$O2=F2 \cdot D2-S1$$

In procedures (A) and (B), the abrasive grain specific gravity da is used as the specific gravity of the solids. In procedure (C), the cutting chips specific gravity ds is used as the specific gravity of the solids. This is because the ratio of the abrasive grains, which function as the solids, included in the used slurry and the primary separation liquid is large, and the ratio of the cutting chips, which function as the solids, included in the secondary separation liquid is large.

(D) The weight SH1 (kg) of the solids and the weight OH1 (kg) of the dispersion liquid that are extracted from the used slurry by the first decanter 31 during the primary separation and the weight SH2 (kg) of the solids and the weight OH2 (kg) of the dispersion liquid that are extracted from the primary separation liquid by the second decanter 32 during the secondary separation are obtained.

$SH1=S0-S1$ $OH1=O0-O1$ $SH2=S1-S2$ $OH2=O1-O2$ (E) The solids recovery rate is calculated.
solids recovery rate during primary separation:

$SH1/S0 \times 100 (\%)$ solids recovery rate during secondary separation:

$SH2/S1 \times 100 (\%)$ total solids recovery rate of the separation system (primary separation+secondary separation):

$(SH1+SH2)/S0 \times 100 (\%)$

In this embodiment, the total solids recovery rate of the separation system (primary separation+secondary separation) is used. In other words, the total solids recovery rate of the entire separation system is obtained when carrying out step S24, which is illustrated in FIG. 10.

Figure 9:
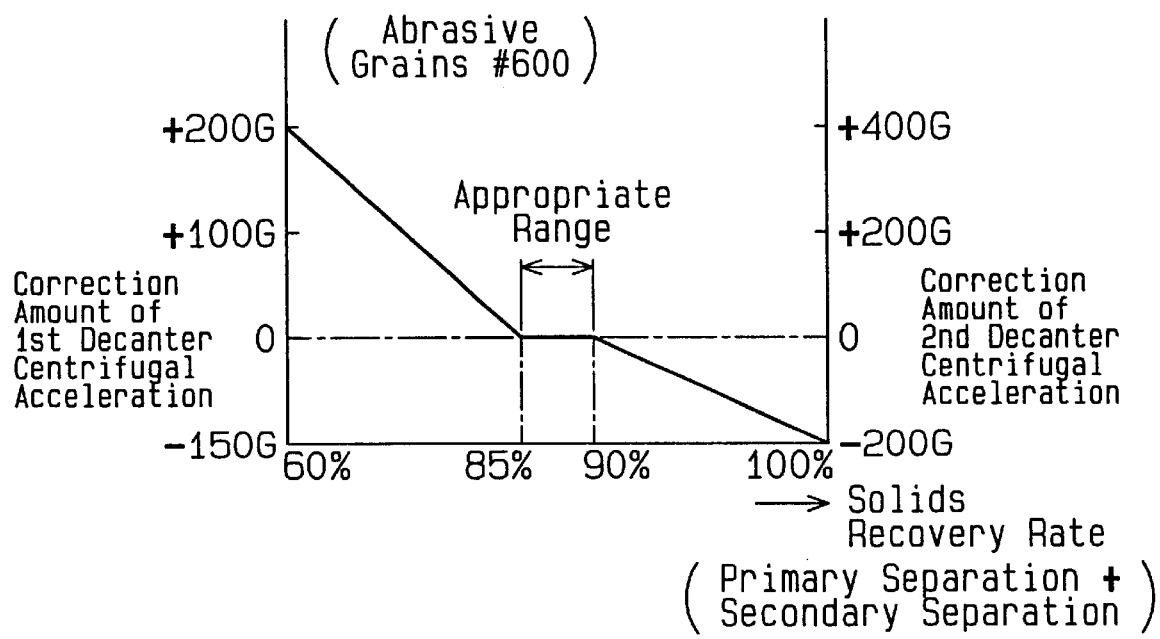
FIG. 9 is a graph showing an example of the correction control executed by the first and second decanters employed in a third embodiment.

FIG. 9 is a graph showing an exemplary relationship between the total solids recovery rate and the correction amount of the centrifugal acceleration (which is related to the rotating speed) of the first and second decanters 31, 32. When performing steps S25 and S26, which are illustrated in FIG. 10, the CPU 45 corrects and changes the rotating speed of the motors 51, 52 of the associated decanters 31, 32 in accordance with the calculated solids recovery rate by referring to the data of FIG. 9. This maintains the solids recovery rate within the appropriate range (e.g., 85% to 90%), as shown in FIG. 9.

For example, when the calculated solids recovery rate is 60%, the rotating speed of the first decanter 31 is corrected such that the centrifugal acceleration is increased by 200G, and the rotating speed of the second decanter 32 is corrected such that the centrifugal acceleration is increased by 400G. Thus, the separation efficiency of the first and second decanters 31, 32 is always appropriate. This maintains the recovery accuracy of the abrasive grains and the dispersion liquid at a high level. If the solids recovery rate becomes lower than the appropriate range, the amount of abrasive grains recovered by the first decanter 31 decreases. This results in a large amount of abrasive grains in the primary separation liquid discharged from the first decanter 31. If the solids recovery rate becomes higher than the appropriate range, a large amount of cutting chips mixes with the abrasive grains recovered by the first decanter 31.

The correction for each decanter 31, 32 is feedback controlled in accordance with the actual properties of the primary and secondary separation liquids discharged from the decanters 31, 32. Thus, feedback correction control is executed accurately in a manner that corresponds with the current state. This recovers the abrasive grains and dispersion liquid in a predictable manner.

Data indicating the relationship between the solids recovery rate and the centrifugal acceleration of the decanters 31, 32 may also be used to control rotation in the decanters 31, 32.

Figure 11:
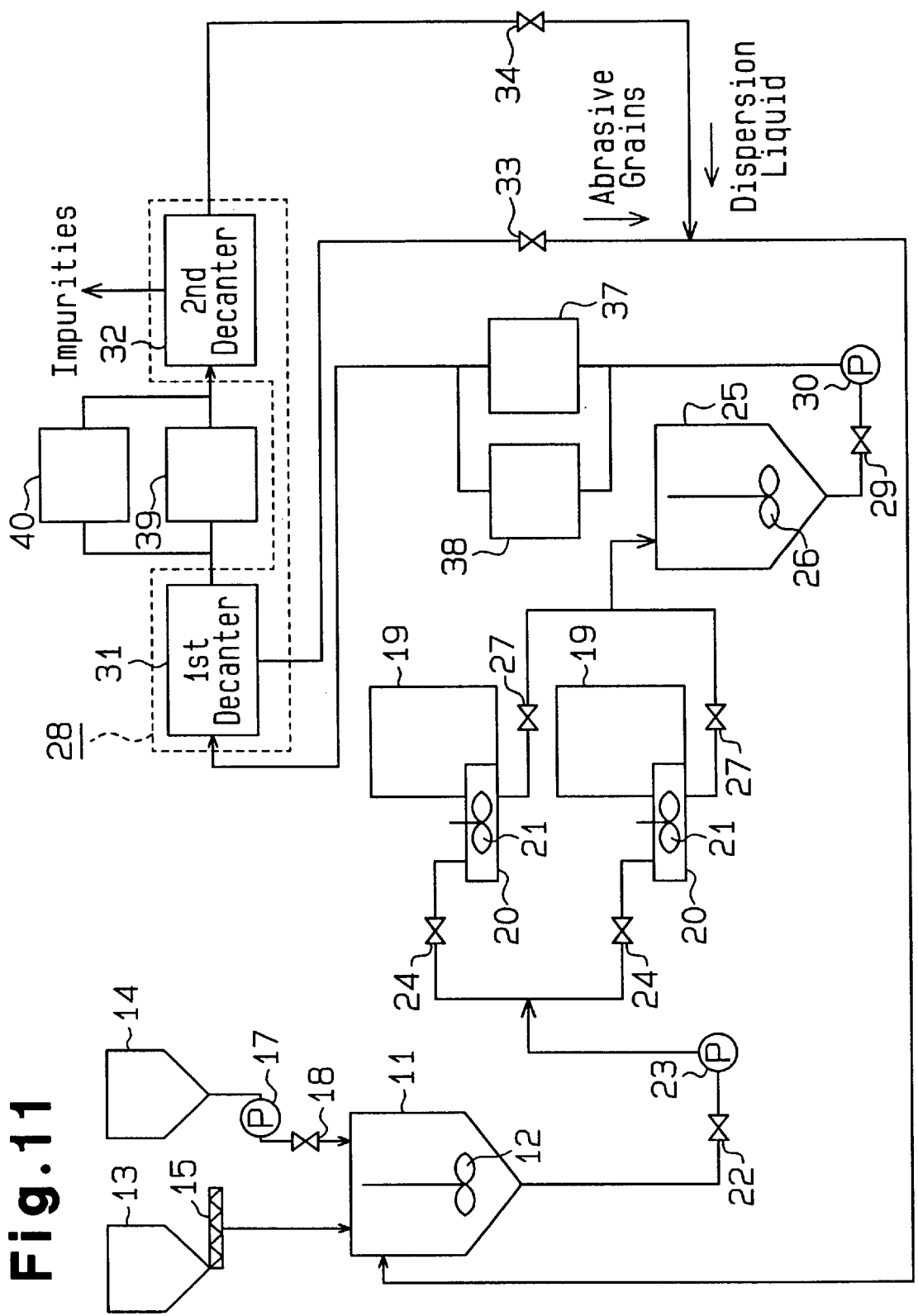
FIG. 11 is a diagrammatic view showing a slurry managing system according to a fourth embodiment.
Figure 12:
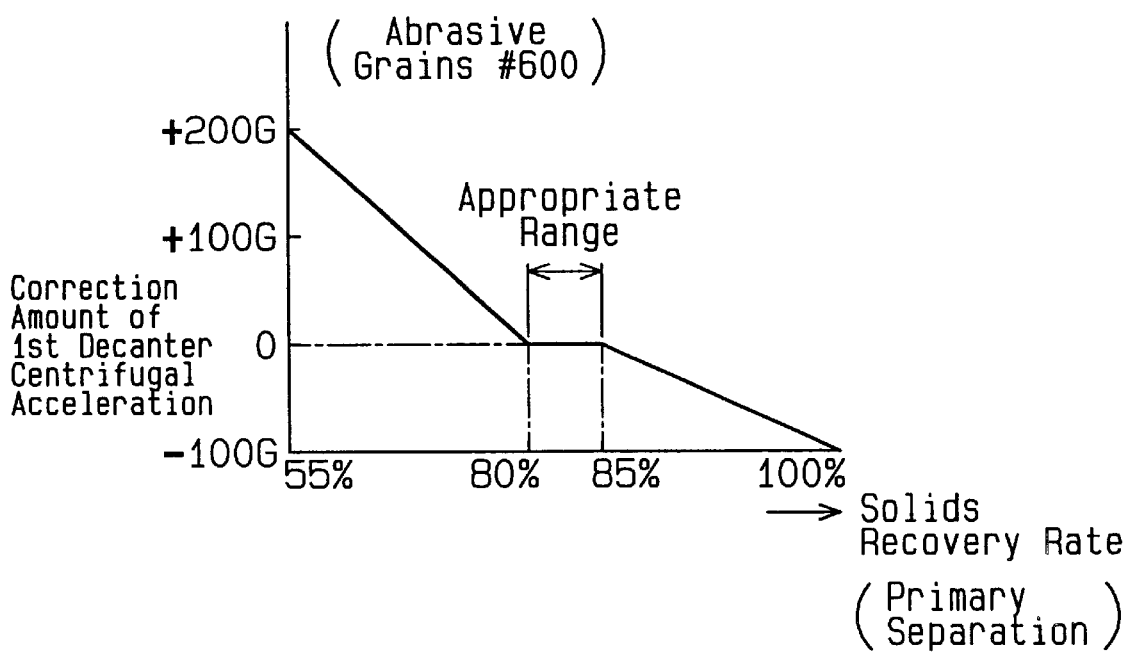
FIG. 12 is a graph showing an example of the correction control executed by the first decanter in the managing system of FIG. 11.

A fourth embodiment according to the present invention will now be described with reference to FIGS. 11 and 12. As shown in FIG. 11, the third specific gravity gage 41 and the third viscosity gage 42 employed in the managing system of FIG. 1 are not employed in the managing system of this embodiment. Therefore, if the processing carried out in the embodiment of FIGS. 9 and 10 are carried out in the managing system of FIG. 11, only the solids recovery rate of the primary separation, which is performed by the first decanter 31, is calculated when obtaining the solids recovery rate. FIG. 12 is a graph showing an exemplary relationship between the solids recovery rate of the primary separation and the centrifugal acceleration correction amount of the first decanter 31. In accordance with the data, only the rotating speed of the first decanter 31 is corrected and changed such that the solids recovery rate is within an appropriate range (e.g., 80% to 85%).

In this embodiment, the programs used during calculations and correction control are simplified. Accordingly, the ROM 46 and the RAM 47 can have a small storage capacity and thus a simplified structure.

Figure 13:
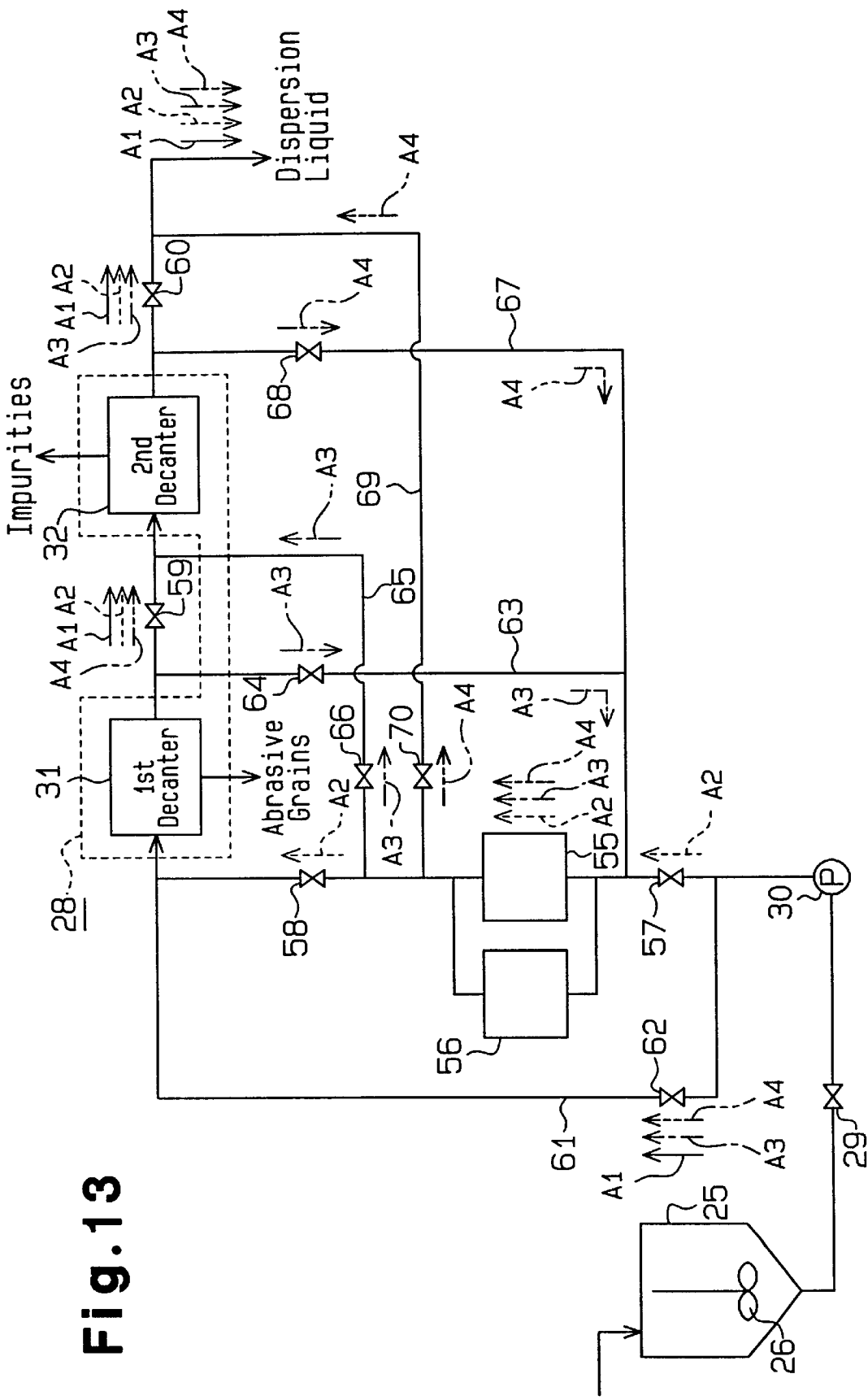
FIG. 13 is a diagrammatic view showing a slurry managing system according to a fifth embodiment.
Figure 14:
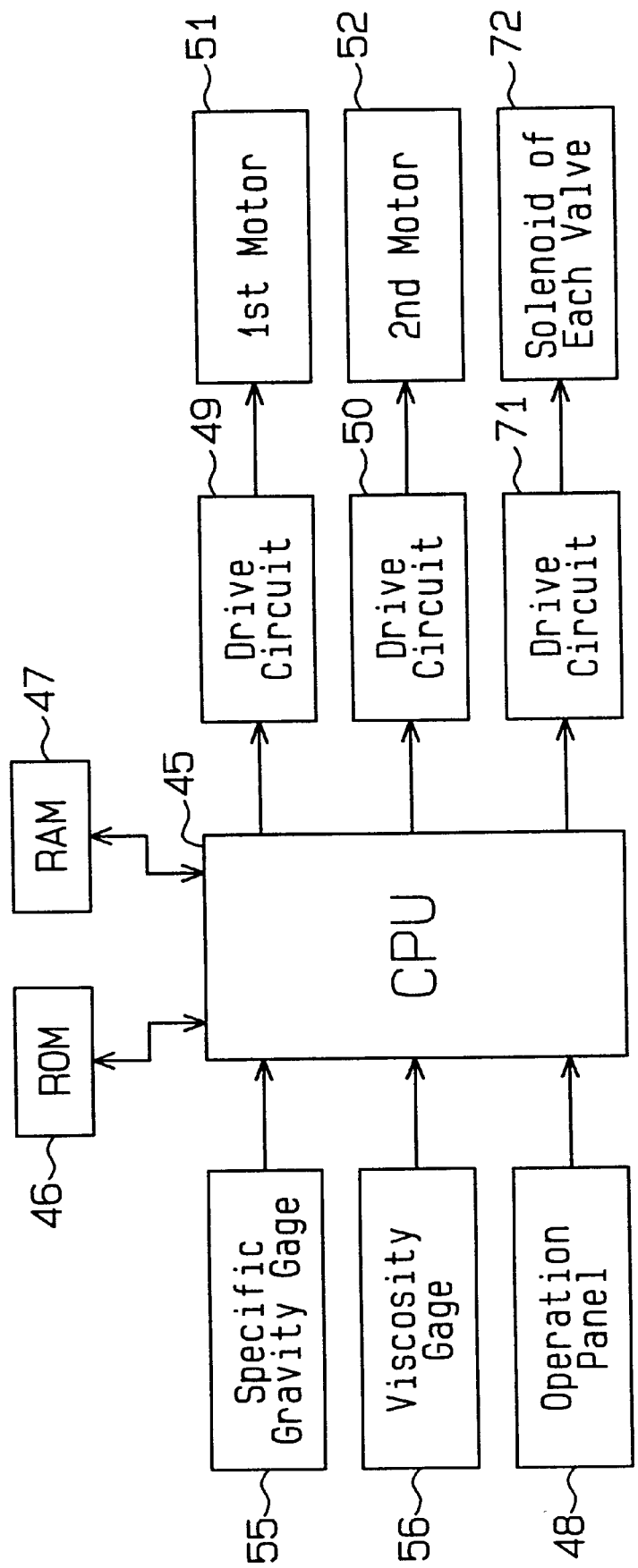
FIG. 14 is block diagram showing the electric structure of the managing system of FIG. 13.

A fifth embodiment according to the present invention will now be described with reference to FIGS. 13 and 14. As shown in FIG. 13, in the managing system of this embodiment, the structure upstream of the slurry waste tank 25 is the same as that of the managing system of FIG. 1. However, the structure downstream of the slurry waste tank 25 differs from that of the managing system of FIG. 1.

A specific gravity gage 55 and a viscosity gage 56 are arranged in the passage through which used slurry is transferred from the slurry waste tank 25 to the separating/recovering mechanism 28. A first valve 57 is arranged at the upstream side of the specific gravity gage 55 and the viscosity gage 56, while a second valve 58 is arranged at the downstream side of the specific gravity gage 55 and the viscosity gage 56. A third valve 59 is arranged at the outlet side of the first decanter 31, while a fourth valve 60 is arranged at the outlet side of the second decanter 32.

A bypass passage 61 extends between the slurry waste tank 25 and the first decanter 31 to bypass the first valve 57, the specific gravity gage 55, the viscosity gage 56, and the second valve 58. A fifth valve 62 is arranged in the bypass passage 61.

A first ingoing passage 63 extends between the outlet side of the first decanter 31 and the upstream side of the specific gravity gage 55 and the viscosity gage 56. A sixth valve 64 is arranged in the first ingoing passage 63. A first outgoing passage 65 extends between the downstream side of the specific gravity gage 55 and the viscosity gage 56 and the inlet side of the second decanter 32. A seventh valve 66 is arranged in the first outgoing passage 65.

A second ingoing passage 67 extends between the outlet side of the second decanter 32 and the upstream side of the specific gravity gage 55 and the viscosity gage 56. An eighth valve 68 is arranged in the second ingoing passage 67. A second outgoing passage 69 extends between the downstream side of the specific gravity gage 55 and the viscosity gage 56 and the downstream side of the fourth valve 60. A ninth valve 70 is arranged in the second outgoing passage 69.

The first to ninth valves 57–60, 62, 64, 66, 68, 70 are selectively opened and closed to switch the flow passage. In accordance with the switched state of the flow passage, the specific gravity gage 55 and the viscosity gage 56 sequentially detect the properties (specific gravity, flow rate, and viscosity) of the used slurry, the primary separation liquid, which is centrifugally separated by the first decanter 31, and the secondary separation liquid, which is centrifugally separated by the second decanter 32.

The electric structure of the above slurry managing system will now be described with reference to FIG. 14. The same reference numerals are given to those components that are the same as the corresponding components of the managing system of FIG. 1. As shown in FIG. 14, the CPU 45 receives detection signals from the specific gravity gage 55 and the viscosity gage 56, and operation signals from the operation panel 48. The CPU 45 also sends actuation signals to the motor 51 of the first decanter 31 and the motor 52 of the second decanter 32 by way of drive circuits 49, 50, respectively. Further, the CPU 45 further sends actuation signals to switching solenoids 72, which are provided for the first to ninth valves 57–60, 62, 64, 66, 68, 70,respectively, by way of a drive circuit 71.

The operation of the slurry managing system of this embodiment will now be described. Normally, during the slurry separation process, the third to fifth valves 59, 60, 62 are opened, while the other valves 57, 58, 64, 66, 68, 70 are closed. When the cutting of workpieces by each wire saw 19 is started in this state, the slurry prepared in the preparation tank is fed to the wire of each wire saw 19 by way of the associated slurry tank 20 (see FIG. 1).

The slurry used by each wire saw 19 is guided to the separating/recovering mechanism 28 through the bypass passage 61 without passing through the specific gravity gage 55 and the viscosity gage 56, as shown in FIG. 13 by solid line arrows A1. The first decanter 31 and the second decanter 32 then recover and return the recyclable abrasive grains and secondary separation liquid, or purified dispersion liquid, to the preparation tank 11.

During the slurry separation process, the CPU 45 switches the first to ninth valves 57–60,62, 64, 66, 68, 70 every predetermined time period to sequentially detect the properties (specific gravity, flow rate, and viscosity) of the primary separation liquid and the secondary separation liquid.

When detecting the properties of the used slurry, only the first to fourth valves 57–60 are opened. The other valves 62, 64, 66, 68, 70 are closed. This transfers the used slurry through a detection portion, which includes the specific gravity gage 55 and the viscosity gage 56, the first decanter 31, and the second decanter 32, as shown in FIG. 13 by dotted-line arrows A2. Accordingly, the specific gravity gage 55 and the viscosity gage 56 send detection signals related to the specific gravity, the flow rate, and the viscosity of the used slurry to the CPU 45.

When detecting the properties of the primary separation liquid, only the fourth to seventh valves 60, 62, 64, 66 are opened. The other valves 57–59, 68, 70 are closed. This transfers the used slurry through the bypass circuit 61, the first decanter 31, the first ingoing passage 63, the detection portion, which includes the specific gravity gage 55 and the viscosity gage 56, the first outgoing passage 65, and the second decanter 32, as shown in FIG. 13 by single-dot-line arrows A3. Accordingly, the specific gravity gage 55 and the viscosity gage 56 send detection signals related to the specific gravity, the flow rate, and the viscosity of the primary separation liquid, which is separated in the first decanter 31, to the CPU 45.

When detecting the properties of the secondary separation liquid, or the recyclable dispersion liquid, only the third, fifth, eighth, and ninth valves 59, 62, 68, 70 are opened. The other valves 57, 58, 60, 64, 66 are closed. This transfers the used slurry through the bypass passage 61, the first decanter 31, the second decanter 32, the second ingoing passage 67, the detection portion, which includes the specific gravity gage 55 and the viscosity gage 56, and the second outgoing passage 69, as shown in FIG. 13 by double-dot-line arrows A4. Accordingly, the specific gravity gage 55 and the viscosity gage 56 send detection signals related to the specific gravity, the flow rate, and the viscosity of the recyclable dispersion liquid, which is separated in the second decanter 32, to the CPU 45.

In the same manner as the first to fourth embodiments, the CPU 45 adjusts the rotating speed of the motors 51, 52 of the associated first and second decanters 31, 32 in accordance with the property detection results of the used slurry, the primary separation liquid, and the secondary separation liquid.

Accordingly, the separation efficiency of the decanters 31, 32 remain substantially constant regardless of the gradual fragmentation of the abrasive grains and mixing of cutting chips in the slurry, which cause fluctuations in the specific gravity and viscosity of the used slurry. Therefore, this embodiment has the same advantages as the first to fourth embodiments.

In particular, the employment of the valves for switching the slurry fluid passage enables sequential detection of the properties of the used slurry, the primary separation liquid, and the secondary separation liquid with a single specific gravity gage 55 and a single viscosity gage 56. This minimizes the number of detectors for detecting the properties of the slurry and simplifies the detecting structure.

The embodiments of the present invention may be modified as described below.

Both the viscosity gage and the specific gravity gage are not necessarily required for the detection of the slurry properties. Only one of the viscosity gage and the specific gravity gage may be employed.

The rotating speed of the second decanter 32 may be constant, while only controlling the rotating speed of the first decanter 31.

The second decanter 32 may be eliminated such that only the abrasive grains are recovered.

The rotating speed of the decanters may be controlled by referring to a cutting chip extraction rate instead of the solids recovery rate. The cutting chip extraction rate is the rate of extraction cutting chips by the separating/recovering mechanism 28 relative to the amount of cutting chips included in the used slurry. The rotating speed of the decanters is controlled such that the cutting chip extraction rate is maintained within a predetermined, appropriate range (e.g., 40% to 80%).

The detection results of the specific gravity gages and the viscosity gages may be indicated on, for example, a display arranged on the operation panel.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

What is claimed is:

1. A system for managing slurry that is used for the machining of workpieces, wherein the slurry includes dispersion liquid and abrasive grains, the managing system comprising:

a separator for performing a separation process on slurry that has been used during machining to recover at least recyclable abrasive grains from the slurry, wherein the separator rotates and applies centrifugal force to the slurry to separate components from the slurry;

a first detector for detecting a specific gravity of the used slurry before undergoing the separation process in the separator;

a second detector for detecting a property of a processed slurry that has undergone the separation process in the separator; and a controller, wherein the controller calculates a rate of recovery of at least the recyclable abrasive grains from the slurry by the separator based on the specific gravity of the used slurry detected by the first detector and the property of the processed slurry detected by the second detector, and wherein the controller controls the rotating speed fo the separator such that the calculated recovery rate reaches a predetermined, appropriate value.

2. The managing system according to claim 1, wherein the first detector further detects a flow rate of the used slurry and the second detector detects a specific gravity and a flow rate of the processed slurry.

3. The managing system according to claim 1, wherein the separator is rotated at a predetermined basic rotating speed, and wherein the controller changes the rotating speed of the separator when the calculated recovery rate moves away from the appropriate value.

4. The managing system according to claim 1, wherein the used slurry contains impurities that are smaller than the abrasive grains, and wherein the separator includes:

a first separator for separating a mixture of the impurities and the dispersion liquid from the used slurry to recovery recyclable abrasive grains from the slurry; and a second separator for separating the impurities from the mixture to recover recyclable dispersion liquid from the mixture.

5. The managing system according to claim 4, wherein the controller controls the rotating speed of at least the first separator.

6. A system for managing slurry that is used for the machining of workpieces, wherein the slurry includes dispersion liquid and abrasive grains, and wherein the slurry, after being used for machining, contains impurities that are smaller than the abrasive grains, the managing system comprising:

a first separator for separating a mixture of the impurities and the dispersion liquid from the used slurry to recover recyclable abrasive grains from the slurry, wherein the first separator rotates and applies centrifugal force to the slurry to separate components from the slurry;

a second separator for separating the impurities from the mixture to recover recyclable dispersion liquid from the mixture to separate components from the mixture;

a first detector for detecting a specific gravity of the used slurry before undergoing the separation process in the first separator;

a second detector for detecting a property of a processed slurry that has undergone the separation process in the first separator; and a controller, wherein the controller calculates at least a rate of recovery of the abrasive grains from the slurry by the first separator based on the specific gravity of the used slurry detected by the first detector and the property of the processed slurry detected by the second detector, and wherein the controller controls the rotating speed of at least the first separator such that the calculated recovery rate reaches a predetermined, appropriate value.

7. The managing system according to claim 6, wherein the first detector further detects a flow rate of the used slurry and the second detector detects a specific gravity and a flow rate of the processed slurry.

8. The managing system according to claim 6, wherein the first separator is rotated at a predetermined basic rotating speed, and wherein the controller changes the rotating speed of the first separator when the calculated recovery rate moves away from the appropriate value.

9. A system for managing slurry that is used for the machining of workpieces, wherein the slurry includes dispersion liquid and abrasive grains, and wherein the slurry, after being used for machining, contains impurities that are smaller than the abrasive grains, the managing slurry comprising:
    a first separator for separating a mixture of the impurities and the dispersion liquid from the used slurry to recover recyclable abrasive grains from the slurry, wherein the first separator rotates and applies centrifugal force to the slurry to separate components from the slurry;
    a second separator for separating the impurities from the mixture to recover recyclable dispersion liquid from the mixture, wherein the second separator rotates and applies centrifugal force to the mixture to separate components from the mixture;
    a detector for detecting a property of the used slurry;
    a speed controller for controlling the rotating speed of at least the first separator, among the two separators, in accordance with the detected property of the slurry; and
    a flow controller for controlling the flow of slurry between the first separator, the second separator, and the detector such that the detector selectively detects the property of the slurry before undergoing the separation process in the first separator, the property of the mixture separated by the first separator, and the property of the dispersion liquid recovered by the second separator.

10. A method for managing slurry that is used for the machining of workpieces, wherein the slurry includes dispersion liquid and abrasive grains, the managing method comprising the steps of:
    separating components from the used slurry that was employed during machining to recover at least recyclable abrasive grains from the used slurry by applying centrifugal force to the used slurry;
    detecting a specific gravity of the used slurry before undergoing the separation process;
    detecting a property of a processed slurry that has undergone the separation process;
    calculating a rate of recovery of at least the recyclable abrasive grains from the slurry based on the specific gravity of the used slurry and the property of the processed slurry; and
    controlling the centrifugal acceleration applied to the slurry such that the calculated recovery rate reaches a predetermined, appropriate value.

11. A system for managing slurry that is used for the machining of workpieces, wherein the slurry includes dispersion liquid and abrasive grains, and wherein the slurry, after being used for machining, contains solids, the solids including recyclable abrasive grains and impurities that are smaller than the abrasive grains, the managing system comprising:
    a first separator for separating a mixture of the impurities and the dispersion liquid from the used slurry to recover recyclable abrasive grains from the slurry, wherein the first separator rotates and applies centrifugal force to the slurry to separate components from the slurry;
    a second separator for separating the impurities from the mixture to recover recyclable dispersion liquid from the mixture, wherein the second separator rotates and applies centrifugal force to the mixture to separate components from the mixture, wherein the rate of the amount of the recovered recyclable abrasive grains and the separated impurities to the amount of the solids contained in the used slurry is represented by a solids recovery rate;
    a first detector for detecting a property of the used slurry before undergoing the separation process in the first separator;
    a second detector for detecting a property of the mixture separated by the first separator;
    a third detector for detecting a property of the dispersion liquid recovered by the second separator; and
    a controller, wherein the controller calculates the solids recovery rate based on the detection values obtained from the first, second and third detectors, and wherein the controller controls the rotating speed of the first and second separators such that the calculated recovery rate reaches a predetermined, appropriate value.

12. A system for managing slurry that is used for the machining of workpieces, wherein the slurry includes dispersion liquid and abrasive grains, the managing system comprising:
    a separator for performing a separation process on slurry that has been used during machining to recover at least recyclable abrasive grains from the slurry, wherein the separator rotates and applies centrifugal force to the slurry to separate components from the slurry;
    a detector for detecting a property of a processed slurry that has undergone the separation process in the separator, wherein the property is a specific gravity or a viscosity of the processed slurry; and
    a controller for controlling the rotating speed of the separator in accordance with the detected property of the processed slurry such that the detected property of the processed slurry reaches a predetermined, appropriate value, wherein the controller refers to data that represents the relationship between the property of the processed slurry and the rotating speed of the separator when controlling the rotating speed of the separator.

13. The managing system according to claim 12, wherein the used slurry contains impurities that are smaller than the abrasive grains, and wherein the separator includes:
    a first separator for separating a mixture of the impurities and the dispersion liquid from the used slurry to recover recyclable abrasive grains from the slurry; and
    a second separator for separating the impurities from the mixture to recover recyclable dispersion liquid from the mixture.

14. The managing system according to claim 13, wherein the detector detects the property of the mixture separated in the first separator, and wherein the controller controls the rotating speed of the first separator such that the detected property of the mixture reaches the appropriate value.

15. The managing system according to claim 13, wherein the detector detects a property of the dispersion liquid recovered in the second separator, and wherein the controller controls the rotating speed of the first and second separators such that the detected property of the dispersion liquid reaches the appropriate value.

* * * * *